(12) United States Patent
DiBiasio et al.

(10) Patent No.: US 8,061,724 B1
(45) Date of Patent: Nov. 22, 2011

(54) TRIANGULAR-SHAPED CHILD'S WAGON

(76) Inventors: Alison Jean DiBiasio, Cranston, RI (US); Steven Marco DiBiasio, Cranston, RI (US)

( * ) Notice: Subject to any disclaimer, the term of this patent is extended or adjusted under 35 U.S.C. 154(b) by 454 days.

(21) Appl. No.: 12/284,124

(22) Filed: Sep. 18, 2008

Related U.S. Application Data

(60) Provisional application No. 60/995,099, filed on Sep. 24, 2007.

(51) Int. Cl.
*B62M 1/00* (2010.01)
(52) U.S. Cl. .................. 280/87.01; 280/47.34
(58) Field of Classification Search .......... 280/30, 280/220, 204, 5.5, 47.34, 47.371, 7.17, 87.01, 280/87.021
See application file for complete search history.

(56) References Cited

U.S. PATENT DOCUMENTS

| | | | | |
|---|---|---|---|---|
| 3,671,055 | A * | 6/1972 | Aarup | 280/87.01 |
| 4,052,082 | A * | 10/1977 | Jones et al. | 280/87.021 |
| 5,360,222 | A * | 11/1994 | Bro et al. | 280/87.021 |
| 5,669,617 | A * | 9/1997 | Pasin et al. | 280/87.01 |
| 6,318,740 | B1 * | 11/2001 | Nappo | 280/87.01 |
| 6,446,981 | B1 * | 9/2002 | Wise et al. | 280/7.17 |
| 6,601,860 | B2 * | 8/2003 | Potter | 280/47.34 |
| 6,805,367 | B1 * | 10/2004 | Heller | 280/87.01 |
| 6,913,271 | B2 * | 7/2005 | Gordon | 280/87.01 |
| 6,932,365 | B2 * | 8/2005 | Chiappetta et al. | 280/47.371 |
| 7,188,845 | B1 * | 3/2007 | Cider, III | 280/47.34 |
| 7,487,977 | B2 * | 2/2009 | Johnson | 280/47.34 |

* cited by examiner

*Primary Examiner* — Hau Phan
(74) *Attorney, Agent, or Firm* — Robert J Doherty

(57) ABSTRACT

A child's wagon having a generally flat floor surrounded by upstanding rear and sidewalls defining central triangularly-shaped seating positions having three corners and in which three children may sit while directly facing each other.

6 Claims, 6 Drawing Sheets

TRIANGULAR-SHAPED CHILD'S WAGON

Applicants claim the benefits of U.S. Provisional Patent Application No. 60/995,099 filed Sep. 24, 2007.

BACKGROUND OF THE INVENTION

This invention relates to a child's wagon, that is, the type of wagon in which children sit and are pulled along by parents or other caregivers. While there are many variants of such wagons both in function and seating arrangement, such known wagons are shaped so as to restrict the seating of children therein to either a face-to-face, direct opposite, i.e., back-to-back, configuration or to a linearly aligned side-by-side configuration.

Accordingly when three children are transported in such wagons, not all the children can face each other and are most often forced into cramped positioning. Especially in their early years, children delight in observing each other especially other children with whom they are already familiar. Thus in introducing a new activity such as transportation via a wagon to such children, it would be supportive to provide positioning such that the children can directly see each other. Accordingly, it would be desirable to provide a child's pull wagon that would facilitate such face-to-face positioning with three children. The above comment and observation is believed especially relevant with three to children of closely spaced ages including triplets.

This and other objects of the present invention are achieved by providing a child's wagon having a generally flat floor surrounded by upstanding rear and side walls defining central triangularly-shaped seating positions having three corners and in which three children may sit while directly facing each other.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1:
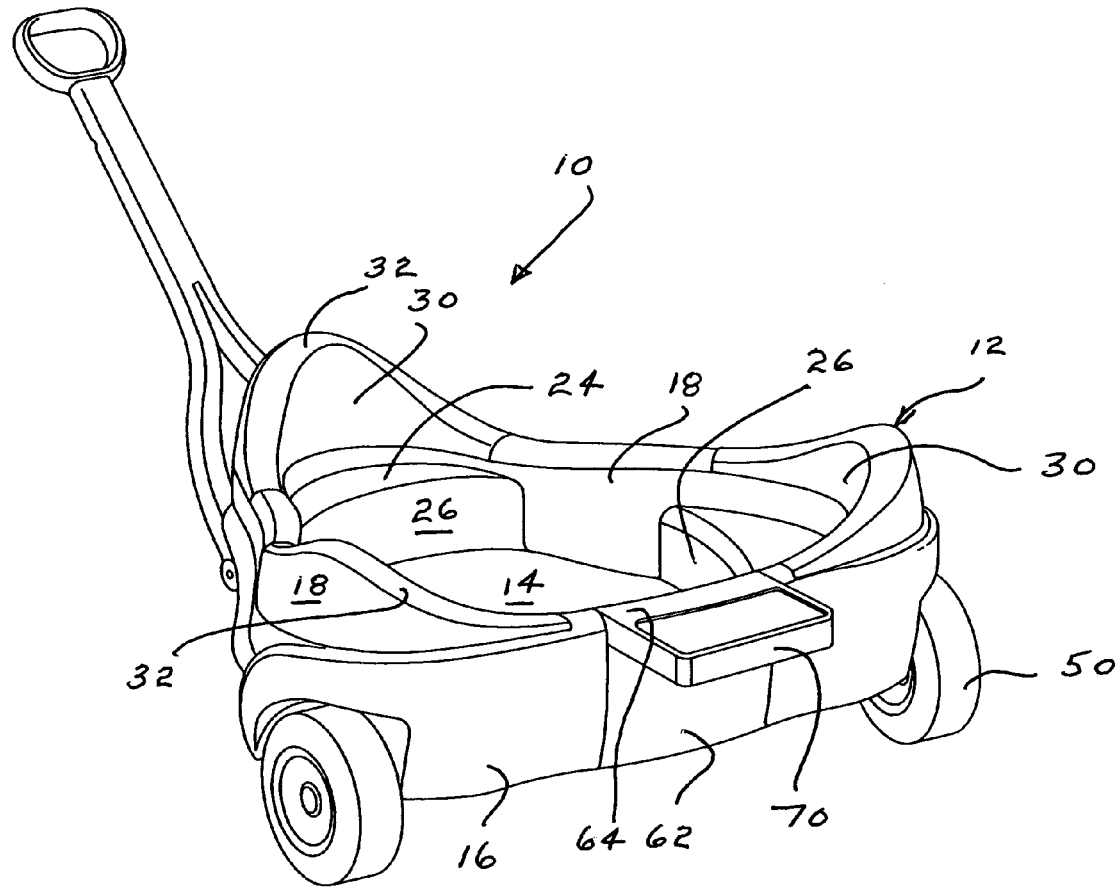
FIG. 1 is a perspective view of a child's wagon incorporating the novel features of the present invention.
Figure 2:
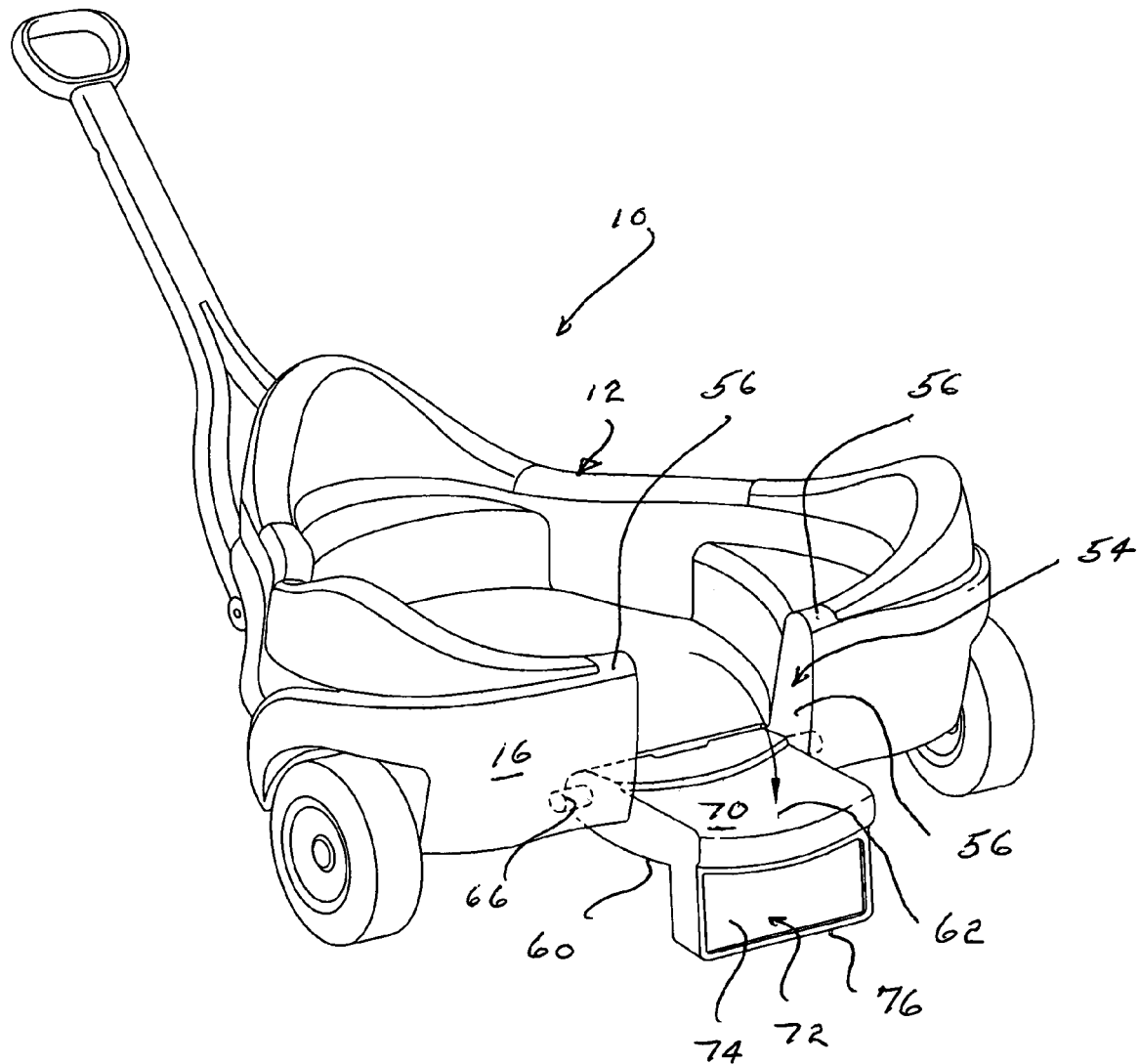
FIG. 2 is a view similar to FIG. 1 with an entry step pivoted to a lowered use position.
Figure 3:
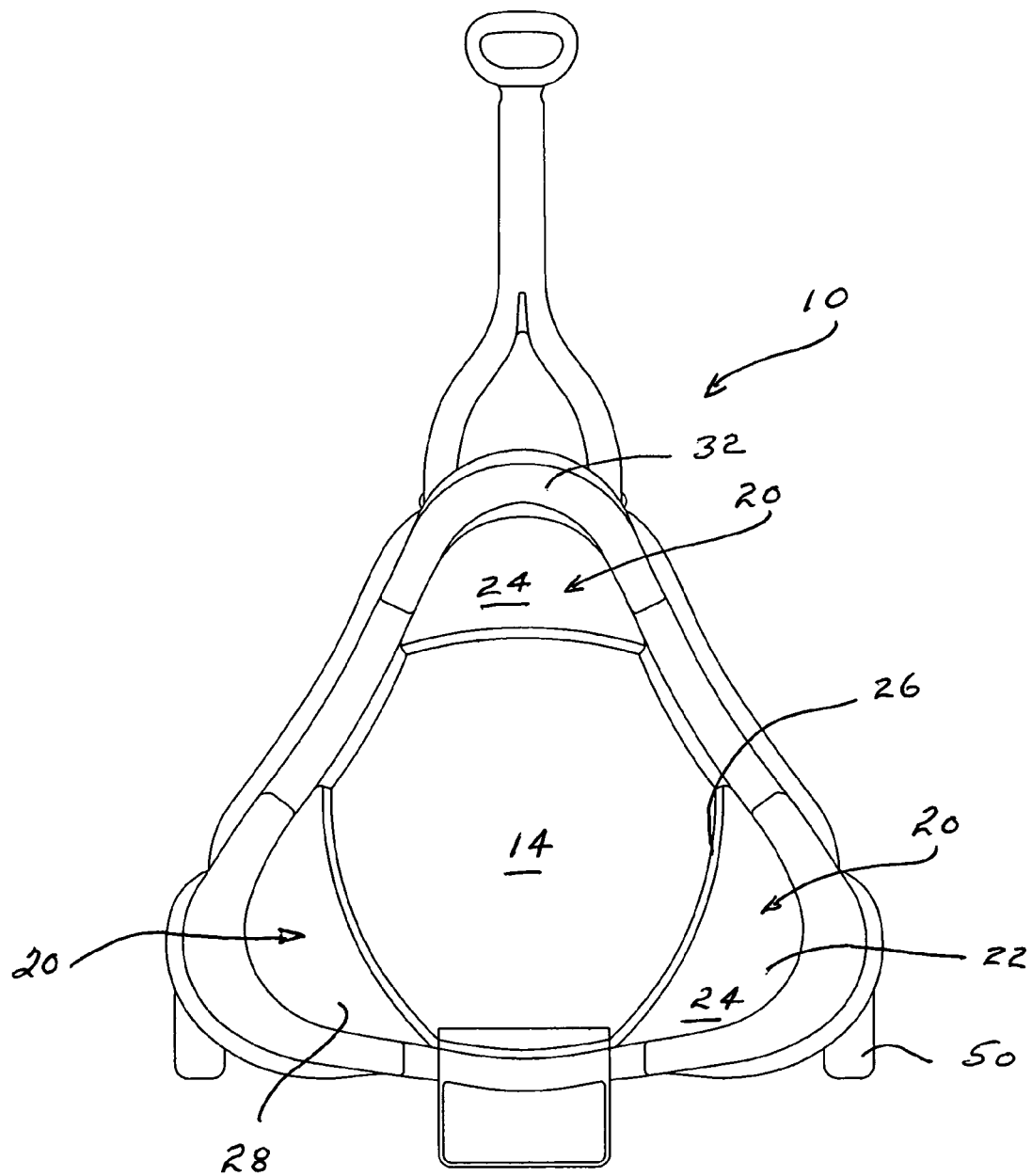
FIG. 3 is a top plan view of FIG. 1.

Turning now to the drawings, the device of the present invention comprises a child's pull wagon 10 having a body 12 preferably formed of a molded plastic or of metal, wood and the like. The body 12 includes a flat bottom wall 14 that serves as the wagon's supporting floor. Upright walls extend from the periphery of the bottom wall and include a back wall 16 and a pair of sidewalls 18 that cooperatively provide an overall triangular shape to the body and floor of the wagon. Such triangular shape is unique to children's wagons and enables the desired face-to-face seating for two or three children and is a key feature of the present invention.

Generally, the walls 16, 18 are of similar length such that the overall shape of the body when viewed in plan is that of an equilateral triangle with three corner positions 20 formed by the intersection of such walls. The corner positions 20 each include a seating area 22 which is preferably raised above the surface of the bottom floor and preferably integrally formed therewith as in the case of the illustrated drawings where an elevated seat 24 including a support wall 26 and a top wall seating surface 28 is depicted. The wagon body portions adjacent such seats 24 may be elevated, that is, portions of the walls 16, 18 may upwardly extend in the three corners of the body so as to form backrests 30 for the children sitting on the seats 24. Backrests 30 preferably are configured with an elevated top rail 32 that is highest at its central point and gradually curves downwardly at each side thereof to merge with the main portions of the walls 16, 18 adjacent thereto. In the above-described manner, comfortable and safe seating for three children is provided in such a way that each of the children faces the other two occupants of the wagon so that they all may socialize, interact and observe each other while seated in the wagon.

Figure 4:
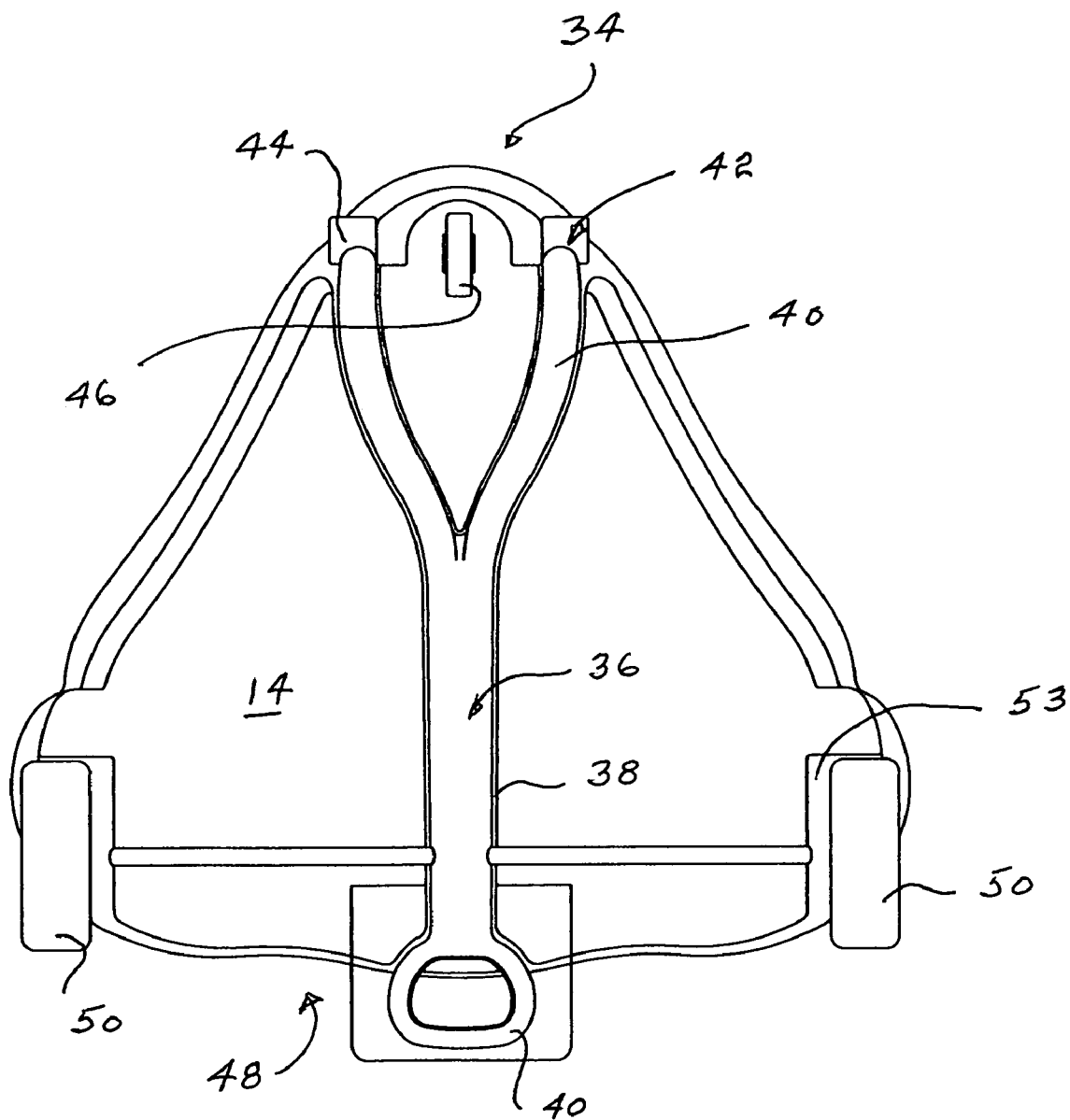
FIG. 4 is a bottom plan view of FIG. 1 with the pull handle shown to in a storage position.
Figure 5:
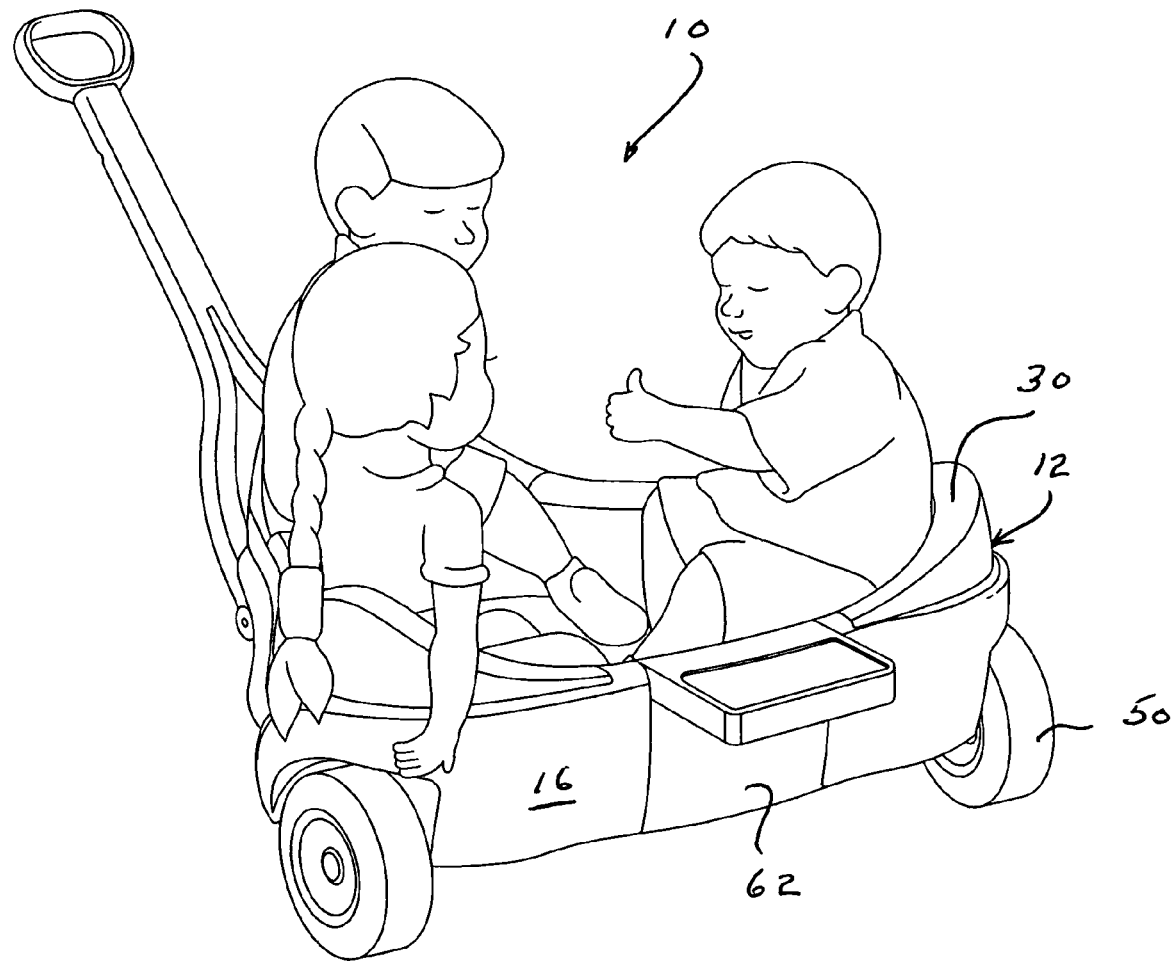
FIG. 5 shows the perspective view of FIG. 1 with three children seated therein in the desired face-to-face position.

The front 34 of the wagon 10 is provided with an elongated handle 36 having a shaft 38 and a hand grasp 40 whereby an adult or other caregiver can pull the wagon. The shaft 38 includes a bifurcated lower end 40 which, in turn, is pivotally connected to the sides 18 of the body as by an axle passing through an axle housing 42. The lower ends 40 may include trunnions 44 that are adapted to receive the opposite ends of the axle. The axle may also support a front wheel 46 as shown in FIG. 4 of the drawings. The rear 48 of the wagon includes a pair of wheels 50 mounted at opposite ends of a rear axle 52 extending through the axle housing 52 formed in the underside of the bottom wall of the wagon body.

The back wall 16 of the wagon may include a break or opening 54 defined by opposed edge walls 56 of the back wall 16 so as to receive an access door 60 preferably centrally located along the wall 16. The door 60 comprises an upright panel 62 having an upper end 64 preferably contiguous with the top of the back wall and a lower end including a pair of pivot pins 66 in turn adapted to be received in the edge walls 56 such that the door may be pivoted downwardly.

When the door panel 62 is pivoted downwardly, the door panel 62 serves as a support surface 70 onto which the children may step, kneel or otherwise be supported to aid them in accessing the wagon interior. The door panel upper end 64 may also include a rearwardly extending shelf 72 having a recessed upper surface 74 for receipt of crayons and other child-related objects and a front edge 76 which when the panel is downwardly pivoted to its access position will contact the ground or other supporting surface to, in effect, stabilize the wagon and provide a more conventional step-type access thereto. The front edge 76 may include a high friction surface provided by an attached layer of rubber or by integral protuberances, etc.

The shelf may also include cup holder depressions as may portions of the top edges of the walls 16, 18. The handle 36 is adapted to fold under the wagon with the grasp 38 overlying and/or contacting the lower surface of the door panel 62. In addition, the front wheel may alternatively be of a freely rotatable type that is supported by a vertically-oriented housing that is free to rotate about the vertical axis, e.g., a supermarket or shopping cart type front wheel.

Figure 6:
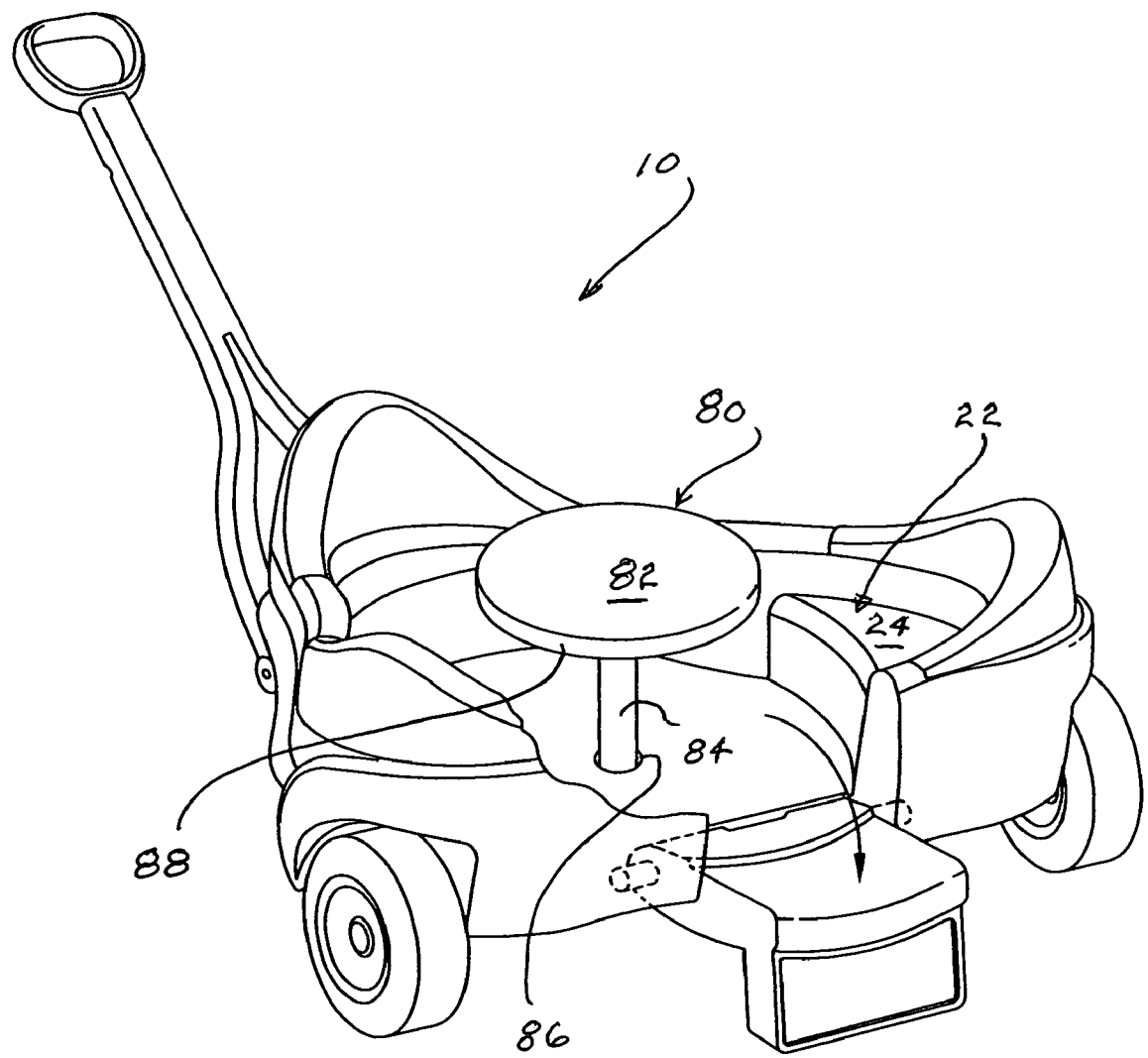
FIG. 6 shows the perspective view of FIG. 1 with a modification, namely, the inclusion of a table.

A further modification of the invention is shown in FIG. 6. Therein, a small table 80 is disposed centrally of the floor, that is, the body bottom wall 14. Accordingly when the table is assembled in place, the table is equally accessible to each occupant of the wagon up to a maximum of three children. The table 80 is readily removable from the wagon and includes a generally circular or triangular top 82 from which a supporting post 84 downwardly extends and is received in an opening 86 disposed in the wall 14. Alternatively, the wall 14 may include an upwardly extending stud (not shown) so as to facilitate the temporary but firm connection of the post to the wagon wall 14. The children may grasp the edges 88 of the table or place their hands on top of the table for added support while they are being transported.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A child's wagon having a generally flat floor surrounded by upstanding contiguous rear and side walls defining a central and generally equal angled and generally equilateral triangularly-shaped seating area, said area having three corners in turn defining seating positions such that three children sitting in said seating position will directly face each other, said seating positions each including a seating area elevated above said wagon floor and an elevated backrest cooperatively formed from portions of said side and rear walls adjacent said seating positions and wherein each of the back rest rear walls extend between the side walls positioned proximally thereto and each of said back rest rear walls face directly towards the center of the wagon floor.

2. The wagon of claim 1, said rear and side walls defining a pointed front, said wagon further including a wheel mounted at each of the three corners so as to support said wagon for wheeled transport via a handle mounted at the front thereof.

3. The wagon of claim 2, wherein a front wheel is mounted in general alignment with the handle and a pair of separate rear wheels mounted at opposite ends of said rear wall.

4. The wagon of claim 1, including a table centrally and removably positioned within said central triangularly-shaped area, said table having a generally plan top.

5. A child's wagon having a generally flat floor surrounded by upstanding rear and side walls defining central triangularly-shaped seating positions having three corners and in which three children may sit while directly facing each other, said floor and walls cooperatively defining said three separate seating positions at said corners of said wagon, said seating positions each including a seating area elevated above said wagon floor and an elevated backrest cooperatively formed from portions of said side and back walls adjacent said seating positions, said wagon further including a wheel mounted at each of the three corners so as to support said wagon for wheeled transport via a handle mounted at the front thereof, wherein a front wheel is mounted in general alignment with the handle and a pair of separate rear wheels mounted at opposite ends of said rear wall, said rear wall including an opening, a door panel pivotally mounted in said opening for movement from a closed position wherein said door panel is vertically disposed and an open access position wherein said door panel is horizontally disposed, said door panel generally disposed in alignment with said floor in said access position.

6. The wagon of claim 5, wherein said door panel includes a generally flat shelf rearwardly extending from the top thereof, said shelf forming a ground supporting contact element when said door panel is disposed in said open access position.

\* \* \* \* \*